United States Patent
Petersen et al.

(10) Patent No.: US 7,644,237 B1
(45) Date of Patent: Jan. 5, 2010

(54) METHOD AND APPARATUS FOR GLOBAL ORDERING TO INSURE LATENCY INDEPENDENT COHERENCE

(75) Inventors: Thomas A. Petersen, San Francisco, CA (US); Sanjay Vishin, Sunnyvale, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 236 days.

(21) Appl. No.: 10/783,960

(22) Filed: Feb. 20, 2004

Related U.S. Application Data

(60) Provisional application No. 60/482,233, filed on Jun. 23, 2003.

(51) Int. Cl.
*G06F 12/08* (2006.01)
(52) U.S. Cl. ............ 711/146; 711/124; 711/141; 711/167
(58) Field of Classification Search .............. None
See application file for complete search history.

(56) References Cited

U.S. PATENT DOCUMENTS

| | | | |
|---|---|---|---|
| 5,537,607 A | | 7/1996 | Ploger, III |
| 5,588,131 A | * | 12/1996 | Borrill ............... 711/146 |
| 6,067,611 A | * | 5/2000 | Carpenter et al. ......... 712/28 |
| 6,112,283 A | * | 8/2000 | Neiger et al. ........... 711/146 |
| 6,275,906 B1 | * | 8/2001 | Nunez et al. ............ 711/141 |
| 6,526,462 B1 | | 2/2003 | Elabd |
| 6,779,052 B2 | | 8/2004 | Hatano |
| 6,892,282 B2 | * | 5/2005 | Hass et al. ............. 711/146 |
| 6,898,766 B2 | * | 5/2005 | Mowery et al. ............ 716/1 |

FOREIGN PATENT DOCUMENTS

EP 0 388 032 A2 9/1990

OTHER PUBLICATIONS

John Kubiatowicz, David Chaiken, Anant Agarwal; "Closing the Window of Vulnerability in Multiphase Memory Transactions"; Laboratory for Computer Science; Massachusetts Institute of Technology; Cambridge, MA 02139; Appeared in ASPLOS V, Oct. 1992.

William J. Dally and Brian Towles; "Route Packets, Not Wires: On-Chip Interconnection Networks"; Computer Systems Laboratory; Stanford University, Stanford, CA 94305.

Sarita V. Adve, Kourosh Gharachorloo; WRL Research Report 95/7; "Shared Memory Consistency Models: A Tutorial"; Western Research Laboratory, 250 University Avenue, Palo Alto, CA 94301.

* cited by examiner

*Primary Examiner*—Gary J Portka
(74) *Attorney, Agent, or Firm*—Sterne, Kessler, Goldstein & Fox P.L.L.C.

(57) ABSTRACT

A method and apparatus is described for insuring coherency between memories in a multi-agent system where the agents are interconnected by one or more fabrics. A global arbiter is used to segment coherency into three phases: request; snoop; and response, and to apply global ordering to the requests. A bus interface having request, snoop, and response logic is provided for each agent. A bus interface having request, snoop and response logic is provided for the global arbiter, and a bus interface is provided to couple the global arbiter to each type of fabric it is responsible for. Global ordering and arbitration logic tags incoming requests from the multiple agents and insures that snoops are responded to according to the global order, without regard to latency differences in the fabrics.

49 Claims, 11 Drawing Sheets

MESI STATES FOR CACHE OF SNOOPED AGENT

SCENARIO #3: AGENT1 WRITE TO SHARED, RESULTING IN REQUEST TO OWN (RTO), WITH AGENT#2 MODIFIED

SCENARIO #4: AGENT1 WRITE TO SHARED, RESULTING IN REQUEST TO OWN (RTO), WITH AGENT#2 MODIFIED, FOLLOWED BY AGENT2 READ MISS, RESULTING IN RTS

METHOD AND APPARATUS FOR GLOBAL
ORDERING TO INSURE LATENCY
INDEPENDENT COHERENCE

CROSS REFERENCE TO RELATED APPLICATION(S)

This application claims the benefit of the following US Provisionally Filed patent application:

| Application # | Filing Date | Title |
|---|---|---|
| 60/482233 | Jun. 23, 2003 | LATENCY INDEPENDENT PROTOCOL COHERENCE |

FIELD OF THE INVENTION

This invention relates in general to field of microprocessors, and more specifically to a method and apparatus for providing latency independent coherence between data in multiple caches associated with multiple processing complexes.

BACKGROUND OF THE INVENTION

A microprocessor based computing system typically includes a processor, a memory complex, an interface to input/output (I/O) devices, and I/O such as a keyboard, mouse, graphical display, hard disk, network interface, etc. In early computing systems, the memory complex communicated directly with the processor whenever the processor needed to read or write data. However, because the speed of the memory complex has not keep pace with speed advances in processors, it became necessary to place relatively small high speed memory between the memory complex and the processor to store data currently being operated on by the processor. The high speed memory is known as cache memory, or simply cache.

When a processor needs to read or write data to memory, if the data associated with the read/write is within the cache, the processor can perform the read/write quickly. However, if the data associated with the read/write is not within the cache, the processor must wait until the data is retrieved from the memory complex, and placed into the cache before the read/write is completed. One skilled in the art will appreciate that such description of cache operation is general, and that many advances have been made to improve cache performance when there is a "miss" in the cache. However, for purposes of this background, it is sufficient to understand that caches store a subset of the data that exists within the memory complex.

Further advances in computing have led to processor based systems where multiple processors operate together, and share a common memory complex. However, to obtain the speed advantage of caches, each of the processors has their own cache between them and the memory complex. But, when two or more caches are used, it is possible that two or more instances of the same data might reside outside the memory complex. In this situation, a methodology must exist to insure that the value of each of these instances is always the same. That is, from the viewpoint of each of the processors, a specific address in memory should refer to data that has only one value, whether or not the data resides in one or more caches. The area of technology associated with the methodology to insure consistency of data between caches is known as coherence.

In general, coherence methodology requires that whenever data is read from a shared memory complex into one or more caches, the data be "tagged" with a state which indicates: 1) what the memory address of the data is; and 2) what the coherent state of the data is. Coherent states are typically: 1) Invalid—indicating that the data in the cache at a particular address is no longer valid; 2) Shared—indicating that the data in the cache can be read but not written to; 3) Exclusive—indicating that the data can be read or written to; or 4) Modified—indicating that the data can be read and written to, but has already been written to by its associated processor. These four coherence states are known as MESI.

To implement a MESI methodology in a multiprocessor system, the current state of the art requires that each of the processors be coupled together, and to the memory complex, via a common bus architecture that allows the processors to "snoop" each others cache, to insure coherency. That is, if one processor wishes to load data from the memory complex into its cache, it must first insure that the data does not reside in another processor's cache in a modified or exclusive state. If the data does reside in another processor's cache in a modified state, for example, that data must first be written back to the memory complex, to insure that the requesting processor gets the latest data. Further, each of the processors are required, according to the common bus protocol, to respond to snoops within a predetermined period of time so that the requesting processor is not stalled, indeterminately.

The inventors of the present invention view the requirement of a common bus architecture, and of conformity to predetermined response periods, within the context of coherency in multiprocessor systems, as disadvantageous to newer computing architectures. More specifically, within the context of system-on-chip architectures, it may be desirable to utilize several processor cores, each of which share a common memory, but where the interface between the processor cores and the common memory does not utilize a common bus architecture. In such a context, the response period of each of the interfaces may be different, and the protocol associated with insuring coherency may be different.

Therefore, what is needed is a method and apparatus to allow multiple processors, and/or I/O devices, to share a common memory, using one or more interfaces, to insure memory coherency without regard to latencies associated with any of the interfaces.

SUMMARY

The present invention provides a method and apparatus for insuring memory coherency between multiple agents that share a memory in environments where fixed latencies cannot be established for snoops. More specifically, multiple agents may share the memory through disparate fabrics, each of which has differing timing constraints, such that snoop responses from the agents do not arrive according to predetermined times. Global ordering of memory requests, snoops, and responses insure coherency without regard to fabric latencies.

In one aspect, the present invention provides a system-on-a-chip (SOC) that has multiple agents which share a memory. The SOC has a first bus interface connected to a first one of the agents for interfacing it to the memory. It also has a second bus interface connected to a second one of the agents for interfacing it to the memory. The first and second bus interfaces include request logic for submitting requests; snoop logic, for responding to snoops; and response logic, for receiving requested data. The SOC also includes a memory controller connected to the memory, the memory controller receiving requests from the first and second agents, and globally ordering the requests. The responses to the requests are latency independent.

In another aspect, the present invention provides a microprocessor based system that includes at least two microprocessors, a memory controller, and a global arbiter. The first microprocessor has a cache for caching data from a memory, and a bus interface that implements a number of bus phases for a memory transaction. The second microprocessor has a cache for caching data from the memory, and a bus interface that implements a number of bus phases for a memory transaction. The memory controller, is connected to the memory. The global arbiter is connected to the bus interface of the first microprocessor, to the bus interface of the second microprocessor, and to the memory controller. The global arbiter receives requests for memory transactions from the first and second microprocessors, and globally orders the requests during request phases of the bus phases, and initiates snoop phases to the bus interfaces to insure coherency. The snoop phases conform to the globally ordering and are latency independent with respect to the request phases.

In another aspect, the present invention provides a global arbiter for use in processor based system to insure coherency between a memory and a plurality of agents. The global arbiter includes request logic, snoop logic, and ordering logic. The request logic receives requests from each of the plurality of agents. The snoop logic initiates snoops to the plurality of agents. And the ordering logic establishes a global order for the requests, and insures that the initiated snoops conform to the global order, the initiated snoops being latency independent with respect to the requests.

In a further aspect, the present invention provides a multiphase protocol for insuring coherency between agents that share a memory through disparate fabrics. The protocol includes a request, snoop and response phases. In the request phase, memory requests are presented to a global arbiter, with the global arbiter ordering the memory requests into a global order. In the snoop phase, snoops are presented to agents coupled to the disparate fabrics according to the global order. In the response phase, responses to the memory requests are provided according to the global order upon completion of their associated snoops.

In a further aspect, the present invention provides a method for providing latency independent coherence among a plurality of agents that share a memory. The method includes: establishing three phases for memory requests including: a request phase; a snoop phase; and a response phase. When multiple memory requests are outstanding, a global order for the requests is established. Each of the requests are submitted during the request phase. The snoop phase is entered for each of the requests, following its request phase, with the snoop phase querying the plurality of agents to determine whether they contain data pertaining to the requests. The response phase is entered for each request after the plurality of agents have responded to the snoop phase for the request, the response phase providing data pertaining to the request to its requesting agent.

In another aspect, the present invention provides a computer program product for use with a computing device, the computer program product including a computer usable medium, having computer readable program code embodied in the medium, for causing a system-on-a-chip, having processor cores each having a cache and sharing a memory, to be described, the computer readable program code having first program code for providing a global arbiter, connected to each of the processor cores; and second program code for providing a bus interface for each of the processor cores to connect the processor cores to the global arbiter; and third program code for providing a bus interface to connect the global arbiter to the memory. The global arbiter receives memory requests from each of the processor cores, establishes a global order for the requests, and initiates a snoop phase for each of the requests according to the global order. The processor cores respond to the snoop phase initiated by the global arbiter at different times.

In another aspect, the present invention provides a computer data signal embodied in a transmission medium having computer-readable program code for providing a latency independent coherence protocol. The program code includes code for providing a request phase for a memory request to be transmitted from an agent to a global arbiter; code for providing a snoop phase where the memory request is ordered by the global arbiter according to a global order, and transmitted to other agents according to the global order; and code for providing a response phase where the response to the memory request is provided to the agent, upon completion of the snoop phase. By establishing a global order for memory requests, a memory is shared by a plurality of agents that are connected to the global arbiter by fabrics having different latencies.

Other features and advantages of the present invention will become apparent upon study of the remaining portions of the specification and drawings.

DETAILED DESCRIPTION

Figure 1:
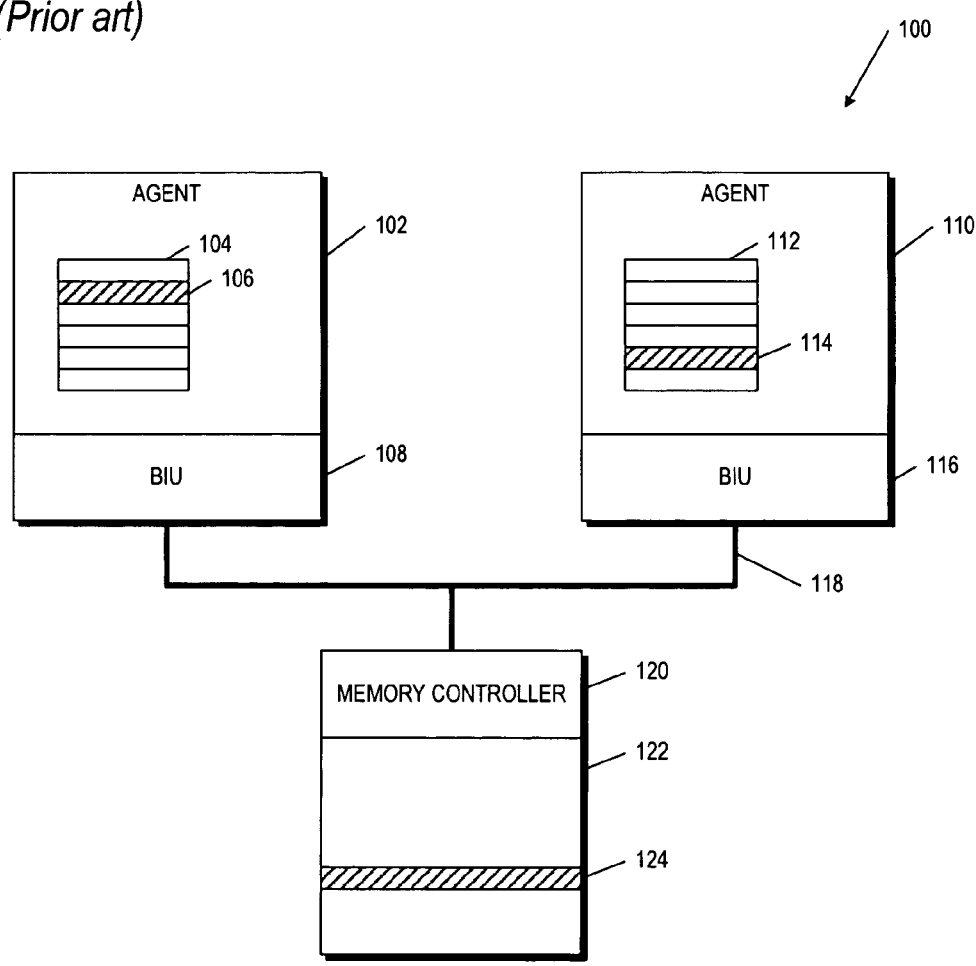
FIG. 1 is block diagram of a prior art multiprocessor system with shared memory.

Referring to FIG. 1, a block diagram is shown of a prior art multiprocessor computing system 100. The system includes two agents 102, 110 coupled to a memory 122 via a host bus 118. The term agent in the present description is meant to refer to a microprocessor, a processor core, a processing complex (having one or more processors), or an I/O device that accesses the memory 122. Each of the agents 102, 110 has a bus interface unit (BIU) 108, 116, respectively for performing reads and/or writes to the memory 122 on behalf of their agents. Within each of the agents 102, 110 are caches 104, 112. The caches 104, 112 contain a number of cache lines 106, 114 that provide temporary storage within the agents 102, 110 of a corresponding "line" of memory 124 within the memory 122. Access to the memory 122 is provided via a memory controller 120. The cache lines 106, 114 are shaded to indicate that they refer to the same "line" 124 of data within the memory 122.

In operation, agent 102 may require access to the "line" of data 124 within the memory 122. If this line of data is not yet within the cache 104, it is retrieved from the memory 122 and placed into the cache 104, at line 106, for use by the agent 102. Later, if agent 110 requires access to line 124 in the memory 122, it can request this line from the memory controller 120. However, the request is not immediately provided. Rather, the request for this line is viewed by the BIU 108 of agent 102 on the bus 118. The BIU 108 checks its cache 104 to determine whether the requested line 124 is also within the cache 104, and if it is, checks to see whether the copy of line 124 within the cache 104 has been modified.

If the requested line 124 does exist within the cache 104, and it has not been modified, or if the requested line 124 does not exist within the cache 104, the BIU 108 alerts the memory controller 120 (or the BIU 116) so that the BIU 116 can retrieve the line from the memory 122 into its cache 112. However, if the requested line 124 does exist within the cache 104, and it has been modified, the modified cache line 106 must be written to the line 124 in the memory 122 before it can be retrieved into the cache 112. One skilled in the art will appreciate that for some bus architectures 118, the BIU 116 may take advantage of the line 106 appearing on the bus during its write back to the memory 122, and latch the data appearing on the bus 118 during its write back so that it does not need to perform another read to the memory controller 120.

A read or write from an agent 102, 110 to shared memory 122 will be referred to in this description as a Request. The determination of whether another agent has a copy of a requested line of data, and providing (if necessary) this line back to the memory 122 will be referred to as a Snoop. The actual satisfying of the Request to the requesting agent will be referred to as the Response. Within present prior art systems such as that described above with respect to FIG. 1, sharing of a memory 122 by two or more agents 102, 110 requires a common bus 118 that has predefined protocols and timings for transitioning from a Request, to a Snoop, to a Response.

Figure 2:
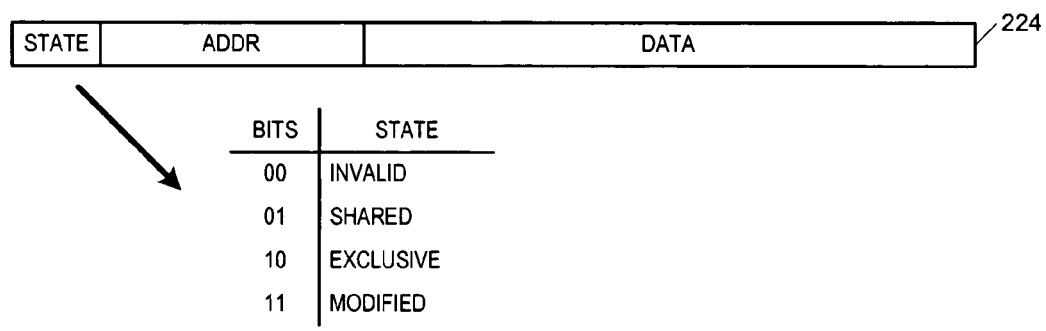
FIG. 2 is a cache line according to the present invention.

Before describing the present invention, reference is made to FIG. 2 where a prior art cache line 224 is shown. The cache line 224 contains a Data portion, an ADDR portion, and a State portion. The Data portion is the actual data read from a memory and placed into a cache for use by an agent. The ADDR portion stores the memory address, or portion of the memory address, commonly referred to as the TAG, of the data within the cache line 224. The State portion is a two-bit value to indicate the state of a cache line, as described in the Background.

Figure 3:
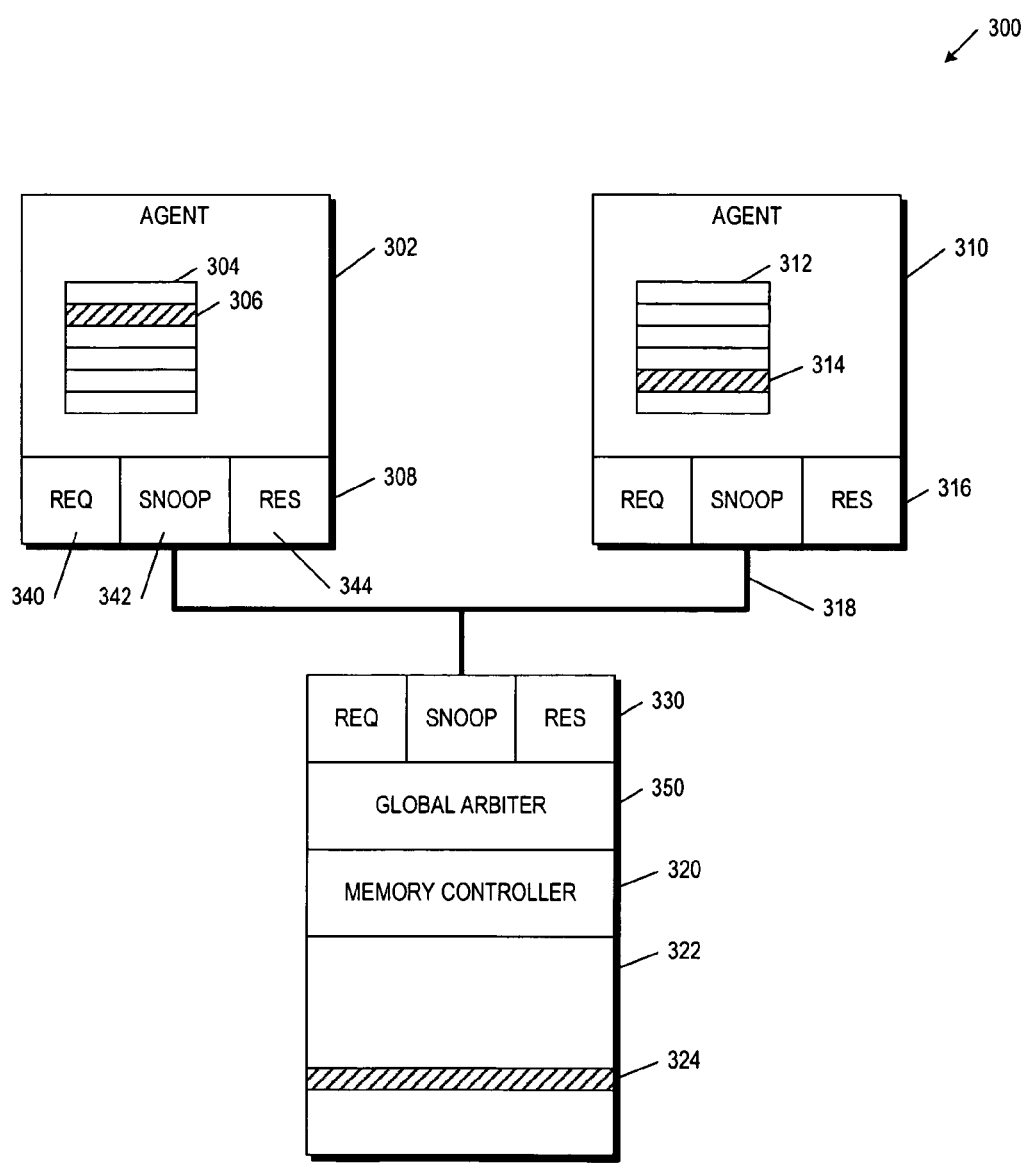
FIG. 3 is a block diagram of two agents sharing memory according to the present invention.

With the above in mind, reference is now made to FIG. 3 which contains a multiprocessor computing system 300 according to the present invention. The computing system includes agents 302, 310 which share a memory 322. Agents 302, 310 have caches 304, 312 with cache lines 306, 314 which temporarily store data retrieved from the memory 322. The agents 302, 310 further include bus interfaces 308, 316, each of which have Request logic 340, Snoop logic 342, and Response logic 344. Operation of the Request, Snoop, and Response logic 340-344 will be further described below. The bus interfaces 308, 316 are coupled to a bus 318 for communication with each other, and to the memory 322. The memory 322 is coupled to a memory controller 320, which is coupled to a global arbiter 350 according to the present invention. The global arbiter 350 is coupled to a bus interface 330 which has request, snoop and response logic. In one embodiment, the request, snoop and response logic is part of the bus interface of each agent that wishes to share memory via the global arbiter 350, whether or not the interconnection between the agents and the global arbiter 350 share a common bus, such as bus 318.

Figure 4:
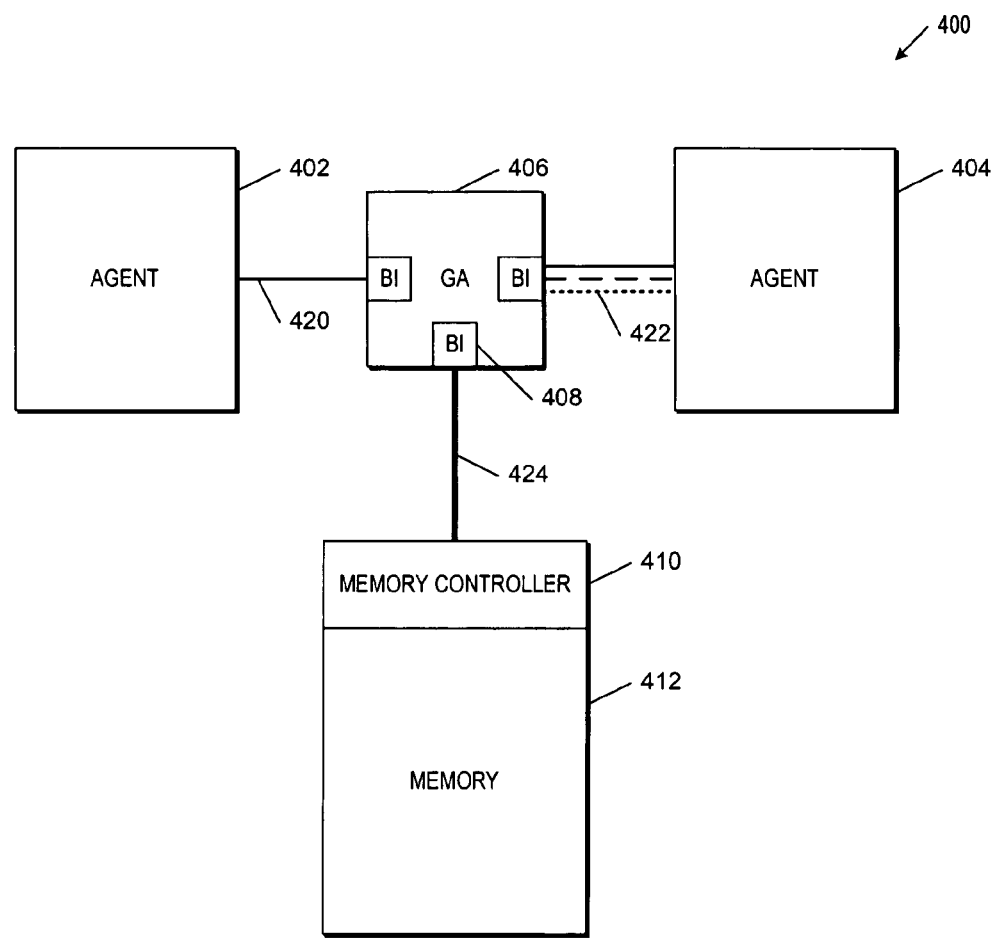
FIG. 4 is a block diagram of two agents sharing memory via disparate fabrics according to the present invention.

Referring now to FIG. 4, a computing system 400 is shown of an embodiment of the present invention which illustrates two agents 402, 404 sharing a memory 412 through a global arbiter 406. However, unlike the system 300, agent 402 communicates with the global arbiter 406 via a first bus 420, agent 404 communicates with the global arbiter 406 via a second bus 422, and the memory 412 communicates with the global arbiter via a third bus 424. The global arbiter 406 has a bus interface 408 for communicating to each of the first, second, third busses 420, 422, 424 in the system 400. While not shown, it should be appreciated that each of the agents 402, 404 have a bus interface similar to the one described with reference to FIG. 3, but specific to a particular bus protocol or architecture. The term bus, for purposes of the present description is meant to include any type of interface between an agent and memory, whether the interface is a true parallel bus, or a serial link. Examples of busses include but are not limited to: 1) host bus for interfacing to MIPS Architecture processors; 2) host bus for interfacing to x86 Architecture processors; and 3) PCI-Express. Thus, the computing system 400 could allow agent 402 to communicate with the global arbiter 406 via a point-to-point link 420 (like PCI-Express), while the agent 404 communicates with the global arbiter 406 via a parallel bus, while the memory 412 communicates with the global arbiter 406 using another serial/point-to-point type link level protocol 424. One skilled in the art should appreciate that what is described with reference to FIG. 4 is the novel idea of coupling a number of different agents to a shared memory utilizing one or more buses, where the buses each have their own load/store protocol, timing, and latency.

Figure 5:
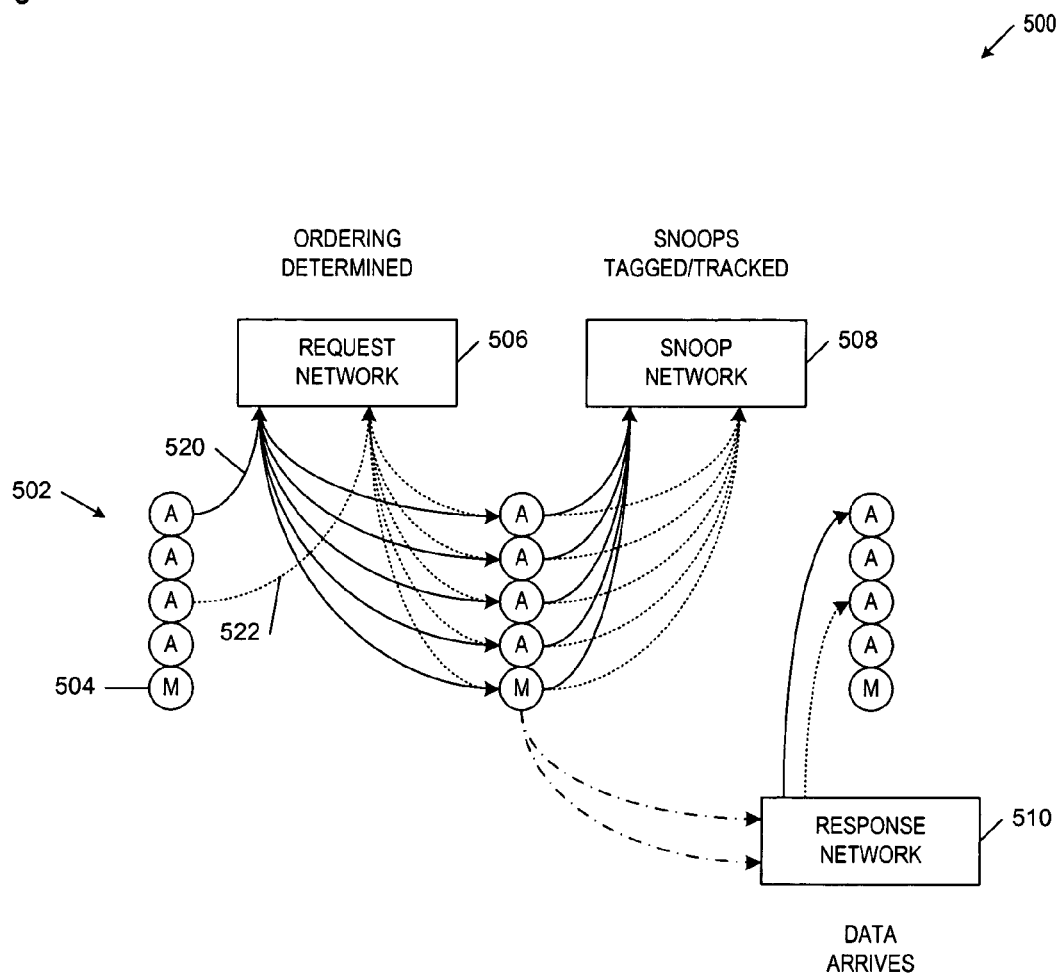
FIG. 5 is a flow diagram illustrating Request, Snoop, and Response networks according to the present invention.

Operation of one embodiment of the present invention will now be described with reference to FIG. 5, to which attention is directed. FIG. 5 provides a flow diagram 500 between multiple agents 502 and a shared memory 504 through one or more busses such as described above with reference to FIG. 4. More specifically, reads/writes to/from the memory 504, from any of the agents 502, flow logically through a global arbiter (not shown) via a Request network 506, a Snoop network 508, and a Response network 510. The request, snoop, and response networks 506-510 should be viewed as "virtual" paths through the global arbiter rather than physical links from each agent, with each physical link having request, snoop, response logic interfaces such as shown in FIG. 4.

In operation, a first agent 502 posts a request 520 to the request network 506. The request 520 may be a read (resulting from a read miss in its cache) or a write (resulting from a write miss in the cache, or a write hit to the cache, but where the associated cache line does not have a state that allows it to be written to). With reference to FIG. 4, the request might be posted by agent 402 via its request logic, to the global arbiter 406 via the first bus 420. The global arbiter 406 then establishes an order for the request 520 relative to other requests it receives from other agents, via the same or other bus interfaces. Once the global order for the request 520 is established, the request 520 enters the snoop network 508. More specifically, the request 520 is communicated from the global arbiter 406 to all other devices that share the memory. In one embodiment, the global arbiter communicates the request 520 to each agent in the system. In an alternative embodiment, the request 520 is viewed by all agents that reside on the same bus as the requesting agent, at the time of the request, while agents that reside on other buses see the request 520 after it is posted by the global arbiter 406. In either case, the request 520 is communicated to the agents 502 during a snoop phase.

The purpose of the snoop phase is to allow each agent to be notified that another agent is requesting access to the memory 504, to indicate to each agent the type of request (read/write), to indicate the memory address of the request, and to allow the agents to examine their own cache to determine whether or not that memory address resides in their cache. In one embodiment, each agent known by the global arbiter 406 is required to respond to a snoop before the snoop phase is completed. The types of responses vary, and are based on the type of request submitted, and whether an agent has a copy of the requested memory location in its cache, and what the state of the copy is in its cache. A complete discussion of the response types, based on the type of request, will be provided below with reference to FIG. 9.

For example, if all of the agents make a determination that the request relates to a memory address that is not contained in their cache, they may provide a response during the snoop phase of Invalid. Thus, once the global arbiter 406 receives an Invalid response from all of the agents that share a common memory, it knows that for the pending request, none of the other agents have data associated with the request in their cache. The snoop phase is therefore completed, and the response phase is allowed to proceed.

During the response phase, the response network is allowed to proceed for the request 520. The purpose of the response phase is to satisfy the request 520. If the request was a read, then the requested data would be retrieved from the memory and provided to the requesting agent. In one embodiment, it would be the global arbiter that would initiate the read from the memory, and then provide the data to the requesting agent. Alternatively, if the data resided in another agent's cache, and that cache was required to write the data back to memory during the snoop phase, the data could be provided concurrently to the memory, and to the requesting agent. In either case, the data would be made available for use by the requesting agent upon completion of the snoop phase.

Also shown by dashed lines in FIG. 5 is a second request 522 presented by a third agent 502 to the global arbiter. The second request 522 may be presented to the request network via the same bus as that of first request 520, or alternatively via another bus coupled to the global arbiter. When the second request 522 is received by the global arbiter, a relative global order is established for the request 522 and a snoop phase for it is begun. As in the first request 520, the second request 522 is communicated to the other agents 502. Once they respond to the snoop, the snoop phase is completed, and the response phase is begun to satisfy the second request 522.

What should be appreciated at this point in the description of the present invention, is that a three phase coherency system is established within the global arbiter to allow a number of agents, on one or more disparate buses or fabrics to share a memory, without regard to timing delays, latencies, or protocol distinctions between the fabrics. The three phases are: Request, Snoop, and Response. The Request phase is begun when an agent submits a request to the global arbiter. The global arbiter establishes a global order for the request. The snoop phase for the request follows the request phase. Once the agents respond to the snoop phase, the response phase is begun to satisfy the request.

Figure 6:
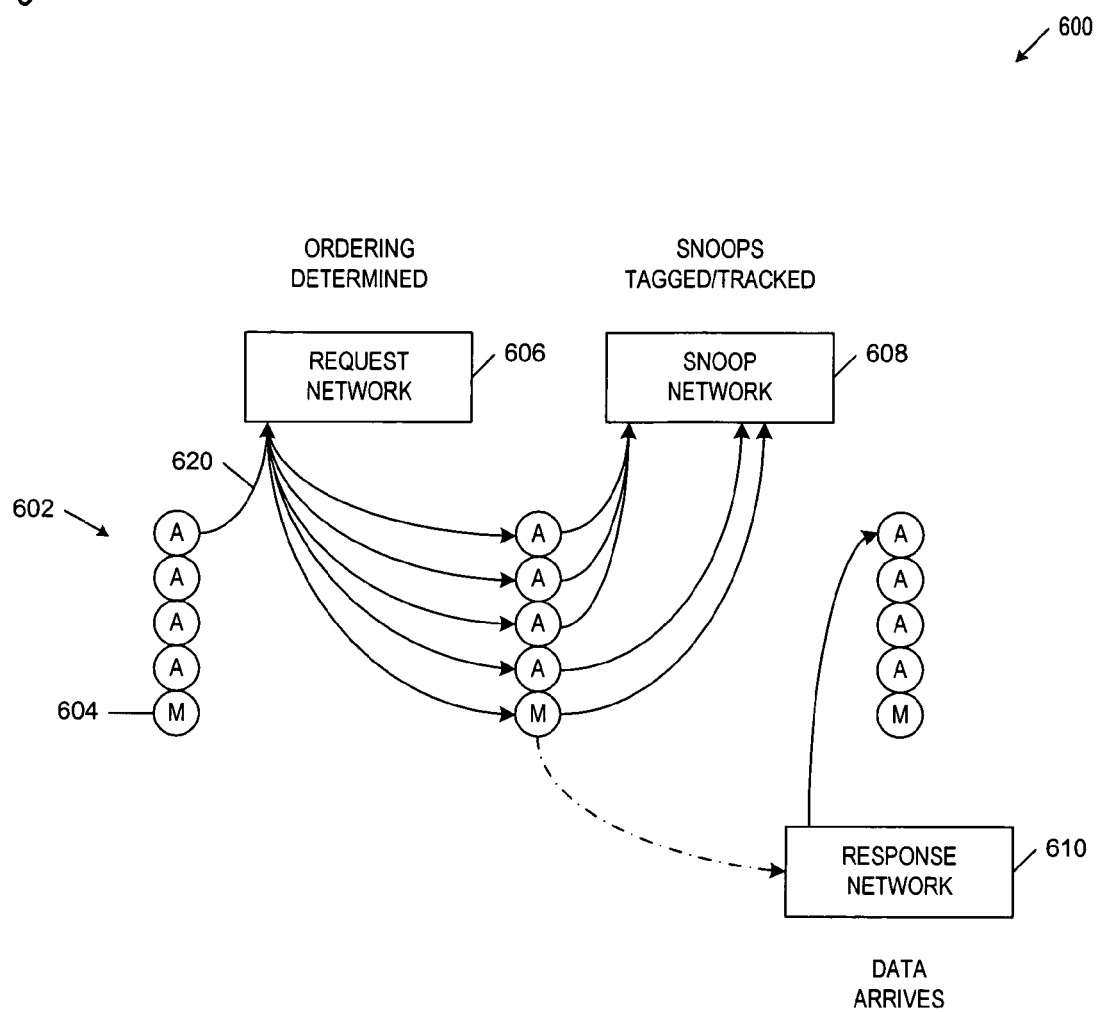
FIG. 6 is a flow diagram illustrating differing latencies during a snoop phase, according to the present invention.

Referring now to FIG. 6, a three phase flow diagram 600 is shown. A first request 620 is presented by a first agent 602 to the request network 606. The global arbiter establishes a relative global order for the request 620. The request phase is completed.

The snoop phase is begun when the request is provided to each of the agents. What is particularly illustrated in FIG. 6 is that the first three agents 602 respond to the snoop network 608 at approximately the same time, perhaps because they are all interconnected to the same bus. However, the fourth agent responds during the snoop phase at a later point in time, perhaps because it interfaces to the global arbiter via a separate bus or fabric. But, regardless of the timing differences between the agents in responding to the snoop phase, once all of the agents respond, the snoop phase ends, and the response phase begins. During the response phase, the request is satisfied.

Figure 7:
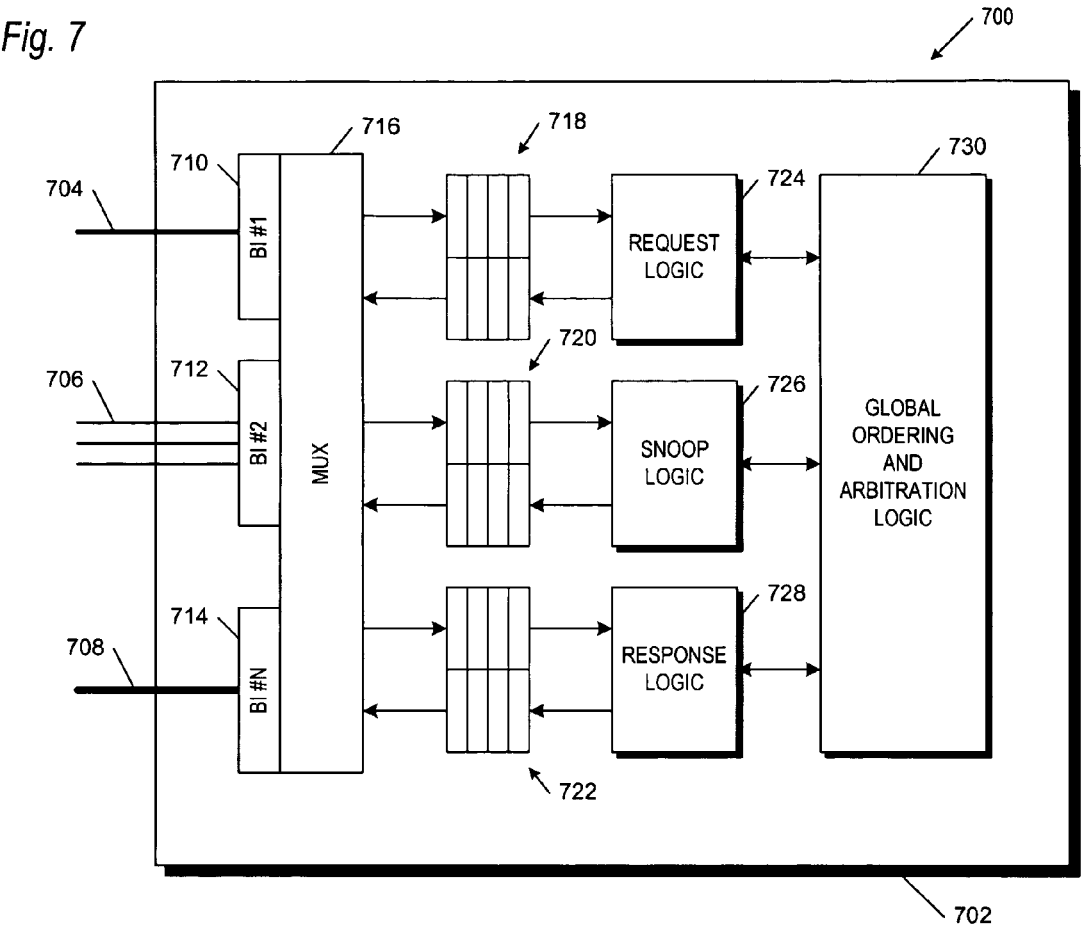
FIG. 7 is a block diagram of one embodiment of a global arbiter according to the present invention.

Referring now to FIG. 7, one embodiment of a global arbiter 700 is provided. The global arbiter 700 includes three bus interfaces 710, 712, 714 for coupling the global arbiter 700 to three distinct buses or fabrics 704, 706, 708, respectively. One skilled in the art will appreciate that each of the fabrics 704, 706, 708 couple the global arbiter 700 to one or more agents. Each of the bus interfaces 710, 712, 714 are connected to a multiplexer 716 which interfaces the distinct bus interfaces 710, 712, 714 to the arbiter 700. The multiplexer 716 is coupled to Request logic 724, Snoop logic 726 and response logic 728 via a set of buffers 718, 720, 722. In one embodiment, the buffers 718, 720, 722 act as queues, or fifos to/from the request logic 724, snoop logic 726, and response logic 728, and the three fabrics 704, 706, 708. The request, snoop and response logic 724, 726, 728 are coupled to Global ordering and arbitration logic 430.

In operation, requests for reads/writes from agents to memory come into the global arbiter 700, from any of the three fabrics 704, 706, 708 and are placed in the queue 718 for presentation to the request logic 724. The request logic presents the requests to the global ordering and arbitration logic 730 so that a global order for each of the requests can be established. In one embodiment, the global ordering and arbitration logic 730 tags each of the incoming requests with a global order tag (not shown) which associates the request with a global order. This tag is then tracked by the global ordering and arbitration logic 730 so it can insure that multiple requests are not responded to out of order. That is, the global ordering and arbitration logic 730 insures that while multiple requests may be pending across disparate fabrics, that the requests are responded to according to the global order established, without regard to latencies between the requester and other agents on any of the fabrics 704, 706, 708. In one embodiment, the global ordering and arbitration logic 730 is coupled to each of the request, snoop, and response logics 724-728 as shown. In an alternative embodiment, the global ordering and arbitration logic 730 is split into a global ordering logic coupled to the request logic 724, and an arbitration logic coupled to the snoop and response logics 726, 728. In the latter embodiment, the global ordering logic is also coupled to the arbitration logic for providing it with information regarding the global ordering.

Once a request is "ordered" according to the global order, the request is passed to the snoop logic 726 for distribution to all known agents, without regard to which fabric they operate on. Each of the agents then responds, during the snoop phase associated with a request, to the snoop logic 726. The snoop logic, in turn, provides the snoop responses from the agents to the global ordering and arbitration logic 730. Once all agents have responded to a snoop, the global ordering and arbitration logic 730 initiates a response to the requesting agent via the response logic 728. In one embodiment, the response logic 728, and its buffers 722 are capable of temporarily storing data being written to memory by an agent responding to a snoop.

The embodiment of the global arbiter shown in FIG. 7 is merely illustrative of the novel aspect of segmenting reads/writes to memory into three phases across disparate fabrics, and insuring a global ordering for the three phases. Alternative embodiments of a global arbiter might have just one bus interface, or just one set of buffers or queues for temporarily storing multiple requests, snoops, and responses. Further, the request, snoop, and response logic may be integrated together, apart from, or within the global ordering and arbitration logic. The embodiment described with respect to FIG. 7 is presented to illustrate the logical operation of the three phase coherency protocol, rather than to specify particular circuitry for insuring coherency. One skilled in the art will appreciate that the layout of the global arbiter should be specific to the particular system in which it is used, with regard to the types of agents, and fabrics, for which it will orchestrate global coherency.

Figure 8:
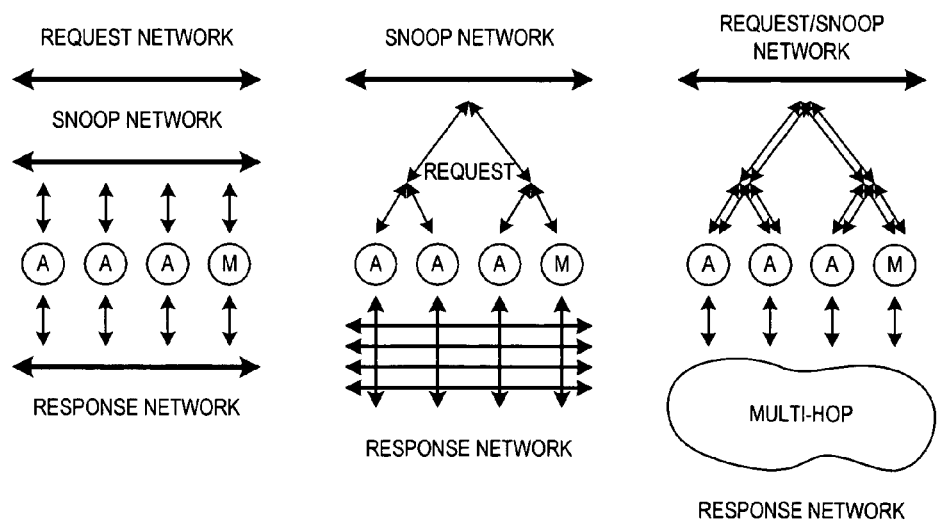
FIG. 8 is a block diagram of three connection embodiments for the latency independent method and apparatus of the present invention.

Referring now to FIG. 8, three connection diagrams are provided to illustrate three topologies for coupling multiple agents and memory to the three request, snoop, response networks described above. The particular topology used for interconnecting agents to memory, and to the global arbiter, will be based on the types of fabrics utilized by the agents, as well as other design considerations. The present invention should not be limited to any particular interconnect topology.

Figure 9:
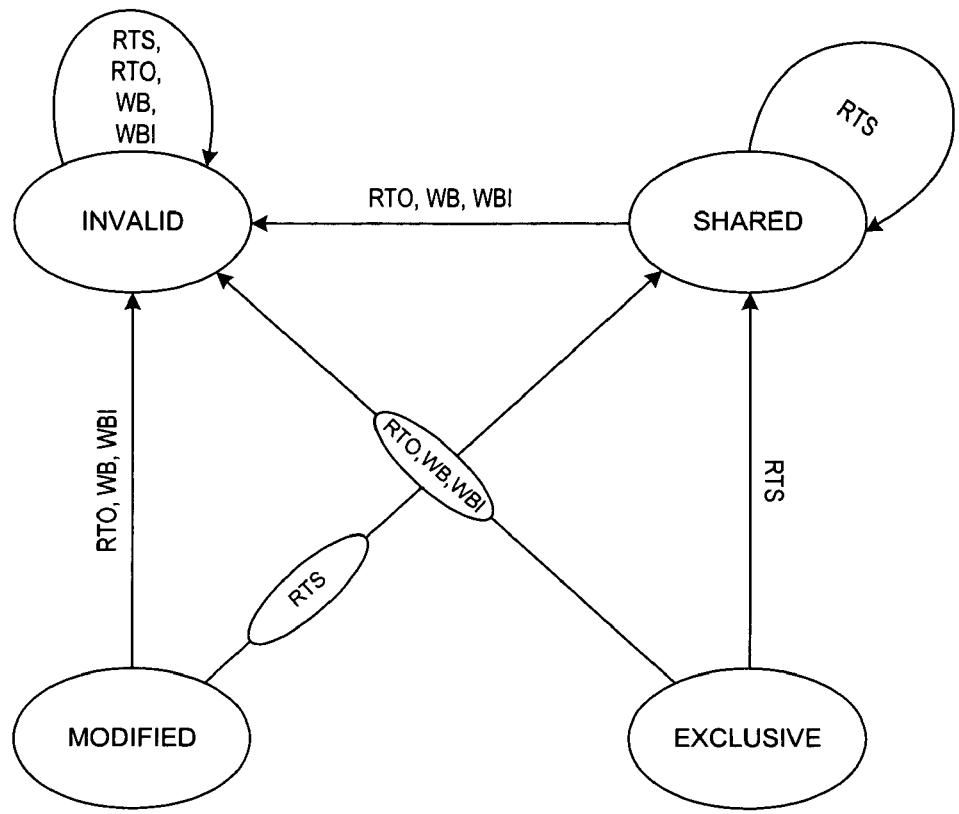
FIG. 9 is a flow diagram illustrating MESI state transitions of a snooped agent according to the present invention.

Referring to FIG. 9, a MESI state diagram 900 is provided to illustrate state changes to a cache line within an agent, upon receipt of a snoop. To better understand diagram 900, a brief description of reads/writes according to one embodiment will be provided. More specifically, an embodiment of the present invention provides for two types of reads, and two types of writes to be performed by agents. These are: 1) Request-to-share (RTS); 2) Request-to-own (RTO); Write Back (WB); and Write Back Invalidate (WBI). The RTS is a read request launched by an agent to get a shared copy of a cache line. This typically occurs when an agent attempts to read a memory location, and that location is not present in its cache. The RTO is a read request launched by an agent to get an exclusive copy of a cache line. The RTO typically occurs when an agent wants a copy of a cache line so that it can subsequently perform a write to the cache line without first notifying other agents, and that location is not present in its cache. A WB typically occurs when an agent has a modified cache line in its cache, which must be written back to memory. A WBI may occur where an agent is an I/O agent (and does not have its own cache). So, what it would like to do is to transfer data into memory, and cause all other agents to invalidate their cache line (if present), even if they have a copy of the cache line, and it is in a modified state.

With the above four cache line states in mind, presume that an agent's cache line for a particular memory address is in the Invalid state. If it receives a snoop from the global arbiter (or from another agent on its bus), and the snoop is either a RTS, RTO, WB, or WBI to that particular memory address, the agent will respond with an Invalid, and will tag that cache line in its cache with that state. When the global arbiter receives an Invalid from an agent, it knows that that agent does not have a copy of the cache line in its cache, and it is therefore done with snooping that agent.

If an agent has a cache line with a state of Shared, the response of that agent to a snoop will vary depending on the snoop. More specifically, if the agent receives a snoop for a request that is an RTS, and the memory address for the snoop corresponds to the shared cache line, then the agent will respond to the global arbiter (or the other agents if on the same bus) with a response of Shared. This indicates to the global arbiter, that this agent does have a copy of the cache line, and will keep the copy in the shared state. Thus, other agents can also keep a copy of this cache line in their cache, as long as they are only reading from it. However, if the agent receives a snoop for a request that is an RTO, WB or WBI, the agent will change the status of that line in its cache to Invalid, and will respond to the global arbiter with an Invalid.

If an agent has a cache line with a state of Exclusive, the response of that agent to a snoop will vary depending on the snoop. More specifically, if the agent receives a snoop for a request that is an RTS, and the memory address for the snoop corresponds to the Exclusive cache line, then the agent will change the state of that cache line to Shared, and will respond to the global arbiter (or the other agents if on the same bus) with a response of Shared. This indicates to the global arbiter that this agent does have a copy of the cache line, and will keep the copy in the shared state. However, since this agent has changed the state of the cache line from Exclusive to Shared, it no longer has the privilege of writing to that cache line, without first notifying the other agents. If the agent receives a snoop for a request that is an RTO, WB or WBI, the agent will change the status of that line in its cache to Invalid, and will respond to the global arbiter with an Invalid.

If an agent has a cache line with a state of Modified, the response of that agent to a snoop will vary depending on the snoop. More specifically, if the agent receives a snoop for a request that is an RTS, and the memory address for the snoop corresponds to the Modified cache line, then the agent will change the state of that cache line to shared, and will cause a write back of the modified cache line to memory. In one embodiment, the write back of the modified cache line will occur during the snoop phase. That is, the write back will pertain to the global order of the initiating request, rather than the write back. If the agent receives a snoop for a request that is an RTO, WB, or WBI, the agent will change the status of that line in its cache to Invalid, and will respond to the global arbiter with an Invalid, after writing back the modified line to memory (at least in the case of RTO, or WB).

Figure 10:
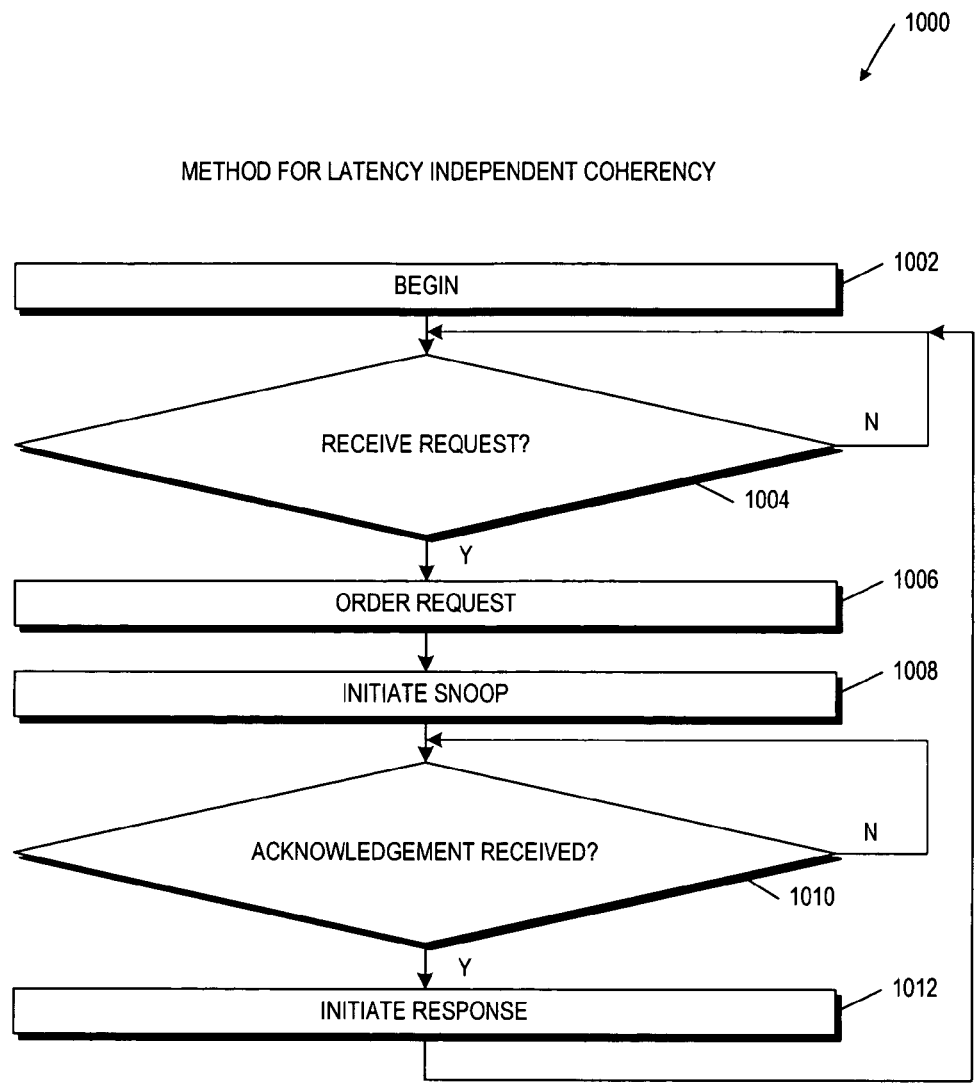
FIG. 10 is a flow chart illustrating the method of the present invention.

With the above understanding of how a particular agent responds to snoops, attention is now directed to FIG. 10 where a flow chart 1000 is provided to illustrate the operation of the present invention in the context of multiple agents. Flow begins at step 1002 and proceeds to decision block 1004.

At decision block 1004 a determination is made by the global arbiter as to whether a request has been received. If not, flow proceeds back to decision block 1004. However, if a request has been received, flow proceeds to block 1006.

At block 1006, the received request is ordered according to the global ordering rules used. The request phase of the request has now completed. Flow then proceeds to block 1008.

At block 1008, a snoop for the request is begun. In one embodiment, the request is broadcast to all of the agents in communication with the global arbiter. In one embodiment, "all" of the agents includes the requesting agent so that the requesting agent can "see" the global order attached to its request. Flow then proceeds to decision block 1010.

At decision block 1010, a determination is made as to whether all of the agents have responded to the snoop. That is, the global arbiter keeps the snoop phase associated with a request pending until all of the agents that cache data have responded to the snoop, either with an Invalid, or Shared response. Once all of the agents that cache data have responded, regardless of latency, the snoop phase is ended, and flow proceeds to block 1012.

At block 1012, the response phase is begun, where the satisfaction of the request is provided, either by the global arbiter, the memory controller, or by another one of the agents as part of its snoop response.

Figure 11:
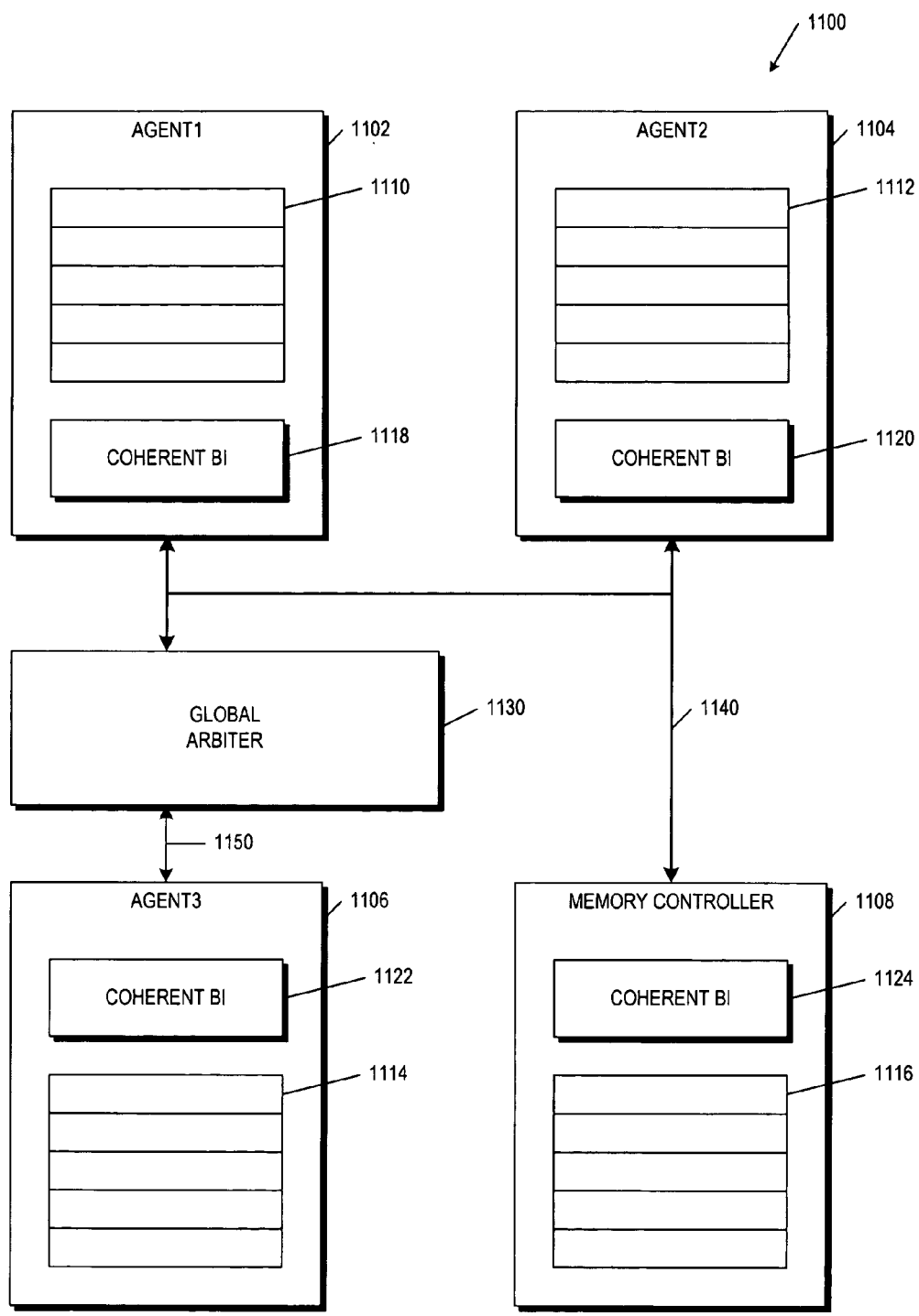
FIG. 11 is a block diagram of three agents sharing memory through disparate fabrics utilizing the method and apparatus of the present invention.

Referring now to FIG. 11, a block diagram 1100 is provided illustrating three agents 1102, 1104, 1106 coupled to a global arbiter 1130 for the purpose of accessing memory 1116 via a memory controller 1108. In this illustration, the agents 1102, 1104 and the memory controller 1108 are coupled together via a common bus 1140 which is also coupled to the global arbiter 1130. The agent 1106 is coupled to the global arbiter 1130 via a disparate fabric 1150 but shares the memory 1116 with the agents 1102, 1104. The global arbiter operates as described above, but will now be particularly illustrated in four scenarios with reference to FIGS. 12A-D.

Figure 12A:
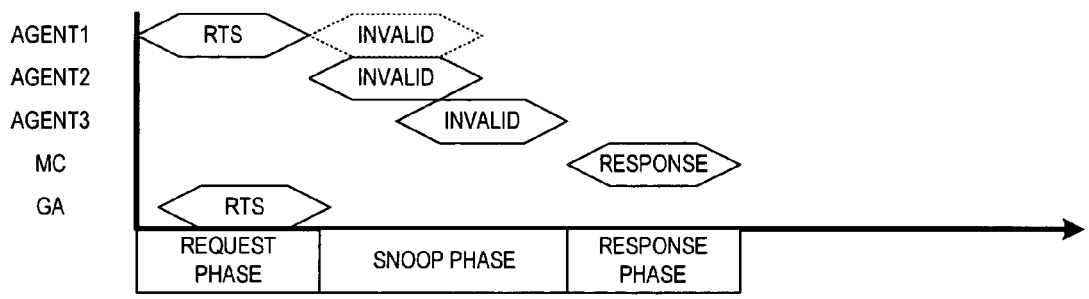
FIGS. 12A-D are phase diagrams illustrating request, snoop and response phases according to the present invention for four different read/write scenarios.
Figure 12B:
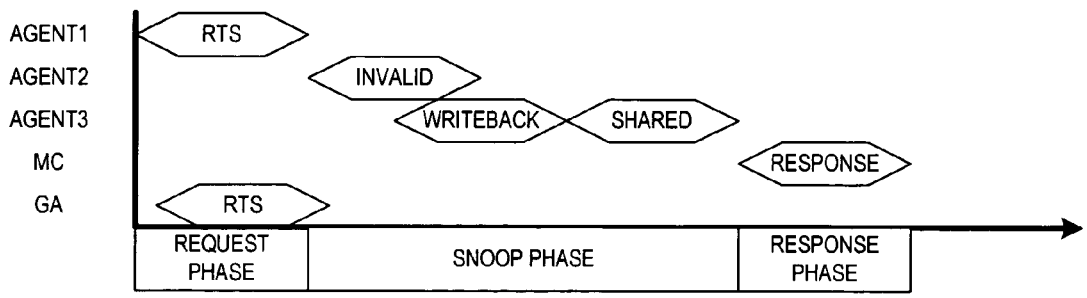

Referring first to FIG. 12A, an RTS is submitted by Agent1. In the embodiment shown in FIG. 11, the request is seen by Agent2 and the Memory Controller immediately, but not by Agent3. The global arbiter 1130 can either provide the request just to Agent3, or alternatively, can broadcast the request to all agents. In either case, the RTS is presented to all agents during the request phase.

After receipt of the RTS by the agents, they must respond either with an Invalid, or a Shared. In this case, Agent2 responds with Invalid. At a later point in time, Agent3 responds with Invalid. In one embodiment, the requesting agent (i.e., Agent1) need not respond to its request. In an alternative embodiment, even the requesting agent responds to a request. In either case, when the global arbiter 1130 is satisfied that all agents it is responsible for have responded, the snoop phase is ended. At this point, the global arbiter 1130 has insured that the requested data either did not exist in any of the other agent's caches, or that if the data did exist, the latest copy of the data now resides in the memory.

In the response phase, the requested data is provided to Agent1, in this case by the memory controller 1108. The three phase coherency is completed.

Referring now to FIG. 12B, Agent1 again submits an RTS. As before, the RTS is broadcast either just to Agent3, to Agent2 and Agent3, or to all agents depending on the implementation. In this example, Agent2 responds immediately with an Invalid. However, Agent3 has determined that it has a copy of the requested data in its cache, and the data has a state of Modified. It therefore causes a write back of the data to memory, and then responds with a state of Shared. After the global arbiter determines that all agents have responded to the snoop, the request is satisfied in the response phase. In one embodiment, the response is provided by the memory controller 1106. In an alternative embodiment, the response may be provided by the global arbiter 1130, either after, or during the write back of the data from Agent3.

Figure 12C:
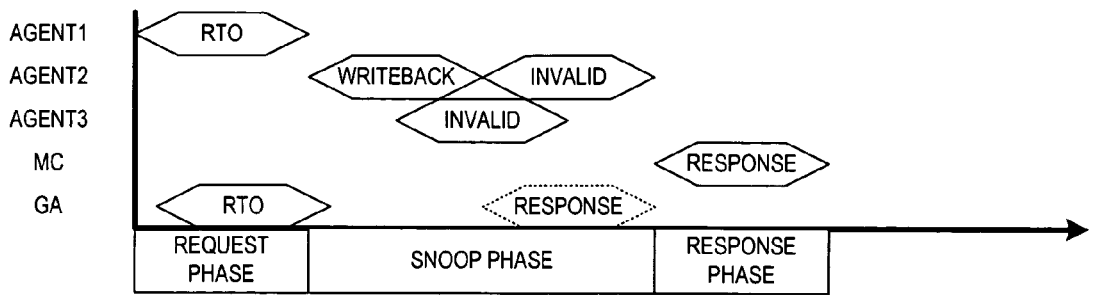

Referring now to FIG. 12C, Agent1 submits an RTO to the global arbiter 1130. In this instance, the data resides in Agent2's cache with a state of Modified. The RTO is broadcast by the global arbiter as described above in the request phase. During the snoop phase, Agent2 performs a write back of its modified data to the memory, and then responds with Invalid. Agent3 also responds with Invalid. At this point, the response is provided to Agent1 by retrieving the data from the memory 1116. Alternatively, if the data were temporarily buffered by the global arbiter 1130 during write back by Agent2, the data could be provided by the global arbiter 1130. Further, since Agent2 is on the same bus 1140 as Agent1, Agent1 may temporarily buffer the write back from Agent2, but await to use the data until the global arbiter 1130 ends the snoop phase for the request. That is, since Agent1 is not coupled directly to Agent3, it will not know when Agent3 responds to the snoop. It must therefore await instruction from the global arbiter 1130 that the snoop phase associated with its request has completed.

Figure 12D:
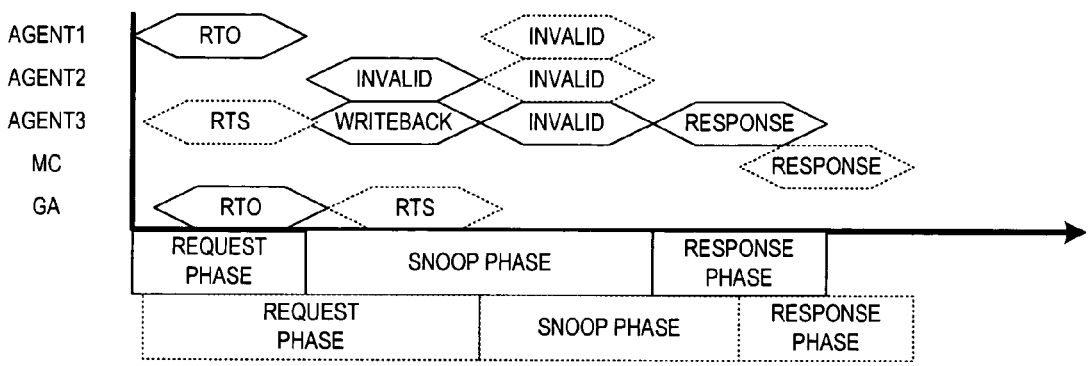

Referring now to FIG. 12D, Agent1 submits an RTO to the global arbiter 1130. Shortly thereafter, Agent3 submits an RTS to the global arbiter 1130. As in the other scenarios, upon receipt of the requests, the global arbiter 1130 tags the requests with a global order to insure that the request, snoop, response phases for each request are completed pertaining to the global order of the requests. The global arbiter first broadcasts the request from Agent1 to one or more of the agents. That completes the request phase for the request from Agent1. Following this, the global arbiter broadcasts the request from Agent3. That completes the request phase for the request from Agent3. During the snoop phase for the request from Agent1, Agent2 responds with an Invalid. However, Agent3 determines that it has a copy of the requested data, in a state of modified. It therefore performs a write back of the data to the memory, and then asserts an Invalid to the global arbiter 1130. Once the global arbiter receives an Invalid from Agent2 and Agent3, it knows that it has completed its snoop phase for the first request. It therefore enters a response phase and provides the requested data to Agent1, similarly to what was described above in FIG. 12C.

Also, during the snoop phase of the second request, Agent1 and Agent2 both respond with an Invalid to indicate that they do not have a copy of the requested data in their caches. Upon receipt of the Invalids from Agent1 and Agent2, the global arbiter 1130 completes the snoop phase for the second request. At this point, the response phase is begun, and the response is provided to Agent3.

What should be appreciated from FIG. 12D is that: 1) multiple requests can be outstanding on the fabrics interconnecting the agents and the memory controller; 2) each of the request, snoop and response networks can operate independently with respect to each of the requests; 3) coherency is insured by requiring that each request, snoop, response pertain to an established global order; and 4) latencies associated with insuring coherency between disparate fabrics are irrelevant.

Although the present invention and its objects, features, and advantages have been described in detail, other embodiments are encompassed by the invention. For example, where all agents within a system are interconnected via a common bus, it is possible that the global ordering of requests can be located within a bus interface of one of the agents. In addition, while the description of the snoop, and response phases for each request were shown to begin upon completion of the previous phases, it is possible to overlap these phases in time, so long as the global order for distinct requests is insured, and that snoops are processed by the agents according to the global order. Further, while discussion of the present invention has been generalized with respect to busses, it is equally applicable to serial (i.e., point to point) fabrics such as PCI-Express. In this fabric, the request, snoop, and response networks could exist on three separate links within the fabric, or alternatively, could operate on three virtual channels within a given link. That is, requests could be made on a first virtual channel, snoops on a second virtual channel, and responses on a third virtual channel, all within the same PCI Express link. Thus, the present invention can easily be adapted to a variety of buses or links, so long as requests are globally ordered to insure coherency. It is the notion of segmenting requests from snoops, and snoops from responses, and decoupling the requests, snoops, and response phases which allow for global coherency without regard to response windows.

Additionally, no specific form of global ordering tag has been described to associate with requests, snoops, and responses. One skilled in the art will appreciate that a rollover counter could be used to provide the tag for a request, incrementing for each request. Alternatively, a time stamp could be used to particularly associate a request with an absolute or relative time value. Any mechanism which tags the requests with a value for global ordering is within the scope of the present invention.

Although the present invention and its objects, features and advantages have been described in detail, other embodiments are encompassed by the invention. In addition to implementations of the invention using hardware, the invention can be embodied in software (e.g., computer readable code, program code, instructions and/or data) disposed, for example, in a computer usable (e.g., readable) medium. Such software enables the function, fabrication, modeling, simulation, description and/or testing of the apparatus and method described herein. For example, this can be accomplished through the use of general programming languages (e.g., C, C++, JAVA, etc.), GDSII databases, hardware description languages (HDL) including Verilog HDL, VHDL, and so on, or other available programs, databases, and/or circuit (i.e., schematic) capture tools. Such software can be disposed in any known computer usable (e.g., readable) medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. It is understood that the invention can be embodied in software (e.g., in HDL as part of a semiconductor intellectual property core, such as a microprocessor core, or as a system-level design, such as a System on Chip or SOC) and transformed to hardware as part of the production of integrated circuits. Also, the invention may be embodied as a combination of hardware and software.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A microprocessor based system comprising:
a memory controller coupled to a plurality of microprocessors and to a memory shared by the microprocessors;
a plurality of memory caches, each respective memory cache of the plurality of memory caches associated with a respective microprocessor of the plurality of microprocessors;
a global arbiter, coupled to each microprocessor and to said memory controller; and
a plurality of buses:
each respective bus of the plurality of buses coupling a respective microprocessor of the plurality of microprocessors to the global arbiter;
each bus implementing a bus protocol that is different from the bus protocol of at least one other bus of the plurality of buses; and
each bus exhibiting a latency for memory transactions that is different from the latency of at least one other bus of the plurality of buses;
wherein:
the plurality of microprocessors are configured to send a plurality of requests for memory transactions to the global arbiter; and
said global arbiter is configured to:
receive via the plurality of buses the plurality of requests for memory transactions from the plurality of microprocessors;
assign a global order to each request of the plurality of requests;
execute according to the global order, a snoop phase for each request of the plurality of requests, wherein each snoop phase comprises determining whether one or more of the plurality of microprocessors has memory cache data associated with a corresponding request;
wait for all responses to come back in response to all the snoop phases of the plurality of requests; and
respond according to the global order to the plurality of requests after the responses are received for all the snoop phases of the plurality of requests;
whereby said global ordering of the plurality of requests results in data coherence among the plurality of caches, said data coherence being latency independent of the latency differences between the plurality of buses.

2. The microprocessor based system of claim 1, further comprising a plurality of bus interfaces;
each respective bus interface of the plurality associated with a respective microprocessor;
each respective bus interface implementing a plurality of bus phases for the memory transactions sent from the plurality of microprocessors to the global arbiter;
wherein said plurality of bus phases implemented by said bus interfaces comprise:
a request phase, where memory requests are submitted via said bus interfaces;
a snoop phase, where a determination is made whether one or more microprocessors of the plurality of microprocessors has data associated with a memory request; and
a response phase, where data associated with a request is received by at least a requesting microprocessor.

3. The microprocessor based system as recited in claim 2 wherein said memory requests comprise:
a request to share;
a request to own; and
a request to write back.

4. The microprocessor based system as recited in claim 3 wherein said request to share results from a read miss in a cache.

5. The microprocessor based system as recited in claim 3 wherein said request to own results from a write miss in a cache.

6. The microprocessor based system as recited in claim 3 wherein said request to write back results from a snoop to a modified cache line.

7. The microprocessor based system as recited in claim 1 wherein said determining whether one or more of the plurality of microprocessors has memory cache data associated with a corresponding request comprises communicating a query corresponding to a request to each of the plurality of microprocessors.

8. The microprocessor based system as recited in claim 2 wherein a first microprocessor's bus interface couples said first microprocessor to a first bus.

9. The microprocessor based system as recited in claim 8 wherein a second microprocessor's bus interface couples said second microprocessor to a second bus.

10. The microprocessor based system as recited in claim 9 wherein said first bus and said second bus are different.

11. The microprocessor based system as recited in claim 9 wherein said first bus and said second bus have different timing latencies.

12. The microprocessor based system as recited in claim 1 wherein said memory controller comprises:
a bus interface for coupling to said global arbiter.

13. The microprocessor based system as recited in claim 1 wherein said global arbiter comprises a bus interface for coupling to each of said plurality of microprocessors and said memory controller.

14. The microprocessor based system as recited in claim 1 wherein said global arbiter comprises:
a plurality of request queues;
a plurality of snoop queues; and
a plurality of response queues;
wherein each of said queues stores a plurality of requests, snoops, and responses, respectively.

15. The microprocessor based system as recited in claim 1 wherein said global arbiter comprises ordering and arbitration logic for receiving the plurality of requests from said plurality of microprocessors, and for ordering said plurality of requests into the global order.

16. The microprocessor based system as recited in claim 15 wherein said ordering and arbitration logic initiates snoops according to said global order.

17. The microprocessor based system as recited in claim 16 wherein said snoops have differing latencies depending on the bus protocols of the plurality of buses.

18. A multiphase method for maintaining data coherency between agents that share a common memory through disparate fabrics with different data latencies, comprising:
presenting in a request phase a plurality of memory requests to a global arbiter, said global arbiter ordering said memory requests into a global order compensating for said differing data latencies, whereby the data coherency is maintained across the agents irrespective of the differing data latencies;
executing in a snoop phase via the global arbiter a snoop corresponding to each memory request of the plurality of memory requests according to said global order, wherein a snoop determines whether one or more agents coupled to the disparate fabrics have data associated with a corresponding memory request; and
providing in a response phase responses to said memory requests according to said global order upon completion of all snoops associated with said memory requests;
whereby said global ordering of the plurality of memory requests results in data coherence among the plurality of agents, said data coherence being latency independent of the latency differences between the disparate fabrics with different data latencies.

19. The multiphase method as recited in claim 18 wherein the agents comprise a plurality of processor cores.

20. The multiphase method as recited in claim 19 wherein each of the agents further comprise a cache.

21. The multiphase method as recited in claim 18 wherein the disparate fabrics comprise a plurality of interfaces.

22. The multiphase method as recited in claim 21 wherein at least one of said plurality of interfaces comprises a bus.

23. The multiphase method as recited in claim 18 wherein at least one of said plurality of interfaces comprises a serial fabric.

24. The multiphase method as recited in claim 23 wherein said serial fabric comprises PCI-Express.

25. The multiphase method as recited in claim 18 wherein said request phase, said snoop phase, and said response phase pertains to each of said memory requests.

26. The multiphase method as recited in claim 25 wherein said memory requests may overlap with said request, snoop, and response phases for another one of said memory requests.

27. The multiphase method as recited in claim 18 wherein said memory requests comprise:
memory reads; and
memory writes.

28. The multiphase method of claim 18, wherein a snoop further comprises the global arbiter communicating a query corresponding to a memory request from a first agent to at least an agent of the agents that share the memory.

29. The multiphase method of claim 18, wherein determining in the snoop phase whether one or more agents coupled to the disparate fabrics have data associated with a given memory request comprises:
communicating from the global arbiter a query corresponding to the given memory request of a first agent to all agents that share the memory; and
waiting until a response to the query is received at the global arbiter from each agent before responding to the given memory request.

30. A computer readable storage medium containing instructions that, when executed by a processor, enable the processor to direct:
a global arbiter, coupled to each of a plurality of processor cores;
a plurality of buses:
each respective bus of the plurality of buses coupling a respective microprocessor of the plurality of processor cores to the global arbiter;
each bus implementing a bus protocol which is different from the bus protocol of at least one other bus of the plurality of buses; and
each differing bus exhibiting a latency for data transactions which is different from the latency of at least one other bus of the plurality of buses;
a bus interface for each of the processor cores to couple the processor cores to the global arbiter via the plurality of buses; and
a bus interface to couple the global arbiter to a memory;
wherein said instructions comprise program code means for causing the processor to direct the global arbiter to:
receive a plurality of memory requests from the plurality of processor cores;
establish a global order for the requests; and
initiate a snoop phase for each request of the plurality of requests according to the global order, each snoop phase comprising the global arbiter querying the plurality of processor cores to determine whether they contain data pertaining to the plurality of memory requests; and
wherein:
the processor cores respond to the snoop phase initiated by the global arbiter at different times; and
said global ordering of the memory requests results in data coherence among the data contained by each processor core, said data coherence being latency independent of the latency difference between the plurality of buses.

31. The computer readable storage medium as recited in claim 30 wherein said instructions enable the processor to direct the global arbiter to implement:

request logic, for receiving requests from the processor cores;

snoop logic, for communicating queries associated with received requests from the global arbiter to the processor cores; and ordering logic, for establishing a global order for received requests, and for causing said snoop logic to communicate the received requests to the processor cores according to the global order.

32. The computer readable storage medium as recited in claim 31 wherein said instructions enable the processor to direct the global arbiter to implement:

response logic, for causing responses to the received requests to be provided upon completion of all of the snoop requests.

33. The computer readable storage medium as recited in claim 31 wherein said instructions enable the processor to direct the global arbiter to implement:

response logic, for causing responses to the received requests to be provided to the processor cores according to the global order.

34. A memory controller coupled to a memory and to a plurality of agents configured to share the memory;

said memory and said plurality of agents coupled via a plurality of buses, each respective agent having a respective bus, each bus of the plurality of buses implementing a bus protocol with a different data latency from the data latency of at least one other bus;

wherein the memory controller is configured to:

receive a plurality of memory requests;

assign a global order to each of the plurality of memory requests, said global order compensating for the differences in data latencies between the plurality of buses;

execute according to the global order, a snoop corresponding to each request, wherein each snoop comprises determining whether one or more of the plurality of agents has data associated with a corresponding request;

wait for all responses to come back in response to all the snoop phases of the plurality of requests; and respond to each request according to the global order;

whereby a data coherency is maintained across the agents irrespective of the differences in data latencies between the plurality of buses.

35. The memory controller of claim 34, wherein in determining whether another agent of the plurality of agents has data associated with a first request from a first agent, the memory controller is further configured to communicate a query corresponding to the first request to at least an agent of the plurality of agents.

36. The memory controller of claim 34, wherein in determining whether one or more of the plurality of agents has data associated with a given request, the memory controller is further configured to:

communicate a query corresponding to the given request to at least an agent of the plurality of agents; and wait until a response to the query is received from the at least an agent before responding to the given request.

37. The memory controller of claim 34, wherein the plurality of agents comprises at least one of microprocessor cores and I/O devices.

38. The memory controller of claim 37, wherein each of said microprocessor cores includes a cache.

39. The memory controller of claim 34, wherein each agent monitors requests to determine whether it holds data associated with a request from one of the plurality of agents.

40. The memory controller of claim 34, wherein if a first agent determines that another one of the plurality of agents requests data that is within the first agent, the first agent informs the memory controller.

41. The memory controller of claim 34, further comprising:

request logic, for receiving the memory requests; and snoop logic, for initiating said snoops to the plurality of agents;

wherein said initiated snoops are latency independent with respect to said requests.

42. The memory controller as recited in claim 41, wherein said request logic comprises a plurality of queues for receiving said requests from the plurality of agents and for presenting said requests to said ordering logic.

43. The memory controller as recited in claim 41, wherein said snoop logic comprises a plurality of queues for storing snoops conforming to said global order.

44. The memory controller as recited in claim 41 wherein said ordering logic causes said snoop logic to initiate snoops according to said global order.

45. The memory controller as recited in claim 41 wherein said global order is established according to a first-in first-out rule.

46. The memory controller as recited in claim 41 wherein said ordering logic insures that responses to said requests are performed according to said global order.

47. The memory controller as recited in claim 41 further comprising:

response logic for ensuring that responses to said requests are performed according to said global order.

48. The memory controller as recited in claim 34 wherein at least one of said plurality of buses supports a plurality of virtual channels.

49. The memory controller as recited in claim 48 wherein said at least one of said plurality of bus interfaces comprises a bus interface to PCI-Express.

* * * * *